(12) United States Patent
Rao et al.

(10) Patent No.: US 7,166,657 B2
(45) Date of Patent: Jan. 23, 2007

(54) ARTICLE UTILIZING HIGHLY BRANCHED POLYMERS TO SPLAY LAYERED MATERIALS

(75) Inventors: Yuan Q. Rao, Pittsford, NY (US); Jin-Shan Wang, Pittsford, NY (US); Thomas N. Blanton, Rochester, NY (US); Samuel Chen, Penfield, NY (US); Robert J. Kress, Rochester, NY (US); Debasis Majumdar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 418 days.

(21) Appl. No.: 10/099,092

(22) Filed: Mar. 15, 2002

(65) Prior Publication Data

US 2003/0203989 A1   Oct. 30, 2003

(51) Int. Cl.
*C08K 9/04* (2006.01)
*C08K 3/34* (2006.01)
*C08L 67/00* (2006.01)

(52) U.S. Cl. ............... 523/216; 523/201; 524/445; 524/449; 524/601

(58) Field of Classification Search ........... 523/216, 523/201; 524/445, 449, 601; 528/272
See application file for complete search history.

(56) References Cited

U.S. PATENT DOCUMENTS

| | | | |
|---|---|---|---|
| 4,435,548 A | 3/1984 | Tomalia et al. | |
| 4,507,466 A | 3/1985 | Tomalia et al. | |
| 4,558,120 A | 12/1985 | Tomalia et al. | |
| 4,737,550 A | 4/1988 | Tomalia | |
| 4,739,007 A | 4/1988 | Okada et al. | |
| 4,810,734 A | 3/1989 | Kawasumi et al. | |
| 4,857,630 A | 8/1989 | Kim | |
| 4,894,411 A | 1/1990 | Okada et al. | |
| 5,102,948 A | 4/1992 | Deguchi et al. | |
| 5,164,440 A | 11/1992 | Deguchi et al. | |
| 5,164,460 A | 11/1992 | Yano et al. | |
| 5,248,720 A | 9/1993 | Deguchi et al. | |
| 5,376,690 A | 12/1994 | Newkome et al. | |
| 5,422,379 A | 6/1995 | Newkome et al. | |
| 5,552,469 A * | 9/1996 | Beall et al. ......... | 524/445 |
| 5,804,613 A | 9/1998 | Beall et al. | |
| 5,854,326 A | 12/1998 | Sakaya et al. | |
| 5,880,197 A | 3/1999 | Beall et al. | |
| 5,891,611 A | 4/1999 | Majumdar et al. | |
| 6,034,163 A | 3/2000 | Barbee et al. | |
| 6,232,378 B1 | 5/2001 | Froehling et al. | |
| 6,353,082 B1 | 3/2002 | Wang | |
| 6,525,170 B1 * | 2/2003 | Wang ............... | 528/421 |
| 6,541,599 B1 * | 4/2003 | Wang ............... | 528/310 |
| 6,541,600 B1 * | 4/2003 | Wang et al. ........ | 528/310 |

FOREIGN PATENT DOCUMENTS

| | | |
|---|---|---|
| EP | 1 273 619 A1 | 1/2003 |
| WO | 00/34393 | 12/1999 |
| WO | 00/49072 | 8/2000 |
| WO | 01/40369 A1 | 6/2001 |
| WO | 03/016392 A1 | 2/2003 |

OTHER PUBLICATIONS

A. Okada et al., Polym Prep., 1987, vol. 28, pp. 447-448.
Rachel Levy and C. W. Francis, Journal of Colloid And Interface Science, *Interlayer Adsorption Of Polyvinylpyrrolidone On Montmorillonite*, Mar. 1975, vol. 50 (3), pp. 442-450.
D.J. Greenland, Journal of Colloid Science, *Adsorption Of Poly (vinyl alcohol ) By Montmorrilonite* vol. 18, 1963, pp. 647-664.
Richard A. Vaia et al., *New Polymer Electrolyte Nanocomposites: Melt intercalation of polyethyleneoxide in mica type silicates*, Advanced Materials, 7(2), 1995, pp. 154-156.
V. Mehrotra, E.P. Giannelis, Solid State Communications, 1991, vol. 77, No. 2, pp. 155-158.
Frechet et al., Science, 1995, vol. 269, pp. 1080-1083.
Ed. T.J. Pinnavia and G.W. Beall, John Wiley & Sons, Ltd. Publishers, Polmer-Clay Nanocomposites, 2000.
Hawker et al., Journal American Chemical Society, 1990, vol. 112, pp. 7638-7647.
Uchida et al., Journal American Chemical Society, 1990, vol. 112 pp. 7077-7079.
Young H. Kim, Journal of Polymer Science, Part A: Polymer Chemistry, 1998, vol. 36, pp. 1685-1698.

* cited by examiner

*Primary Examiner*—Tae H Yoon
(74) *Attorney, Agent, or Firm*—Lynne M. Blank

(57) ABSTRACT

The present invention relates to a splayed layered material comprising a layered material splayed with a highly branched polymer. Additional embodiments include a splayed layered material comprising a matrix polymer and layered material wherein said layered material is splayed with a highly branched polymer, an article comprising the splayed layered material in a matrix, and an exfoliated material.

34 Claims, 3 Drawing Sheets

ARTICLE UTILIZING HIGHLY BRANCHED POLYMERS TO SPLAY LAYERED MATERIALS

FIELD OF THE INVENTION

The invention relates to layered materials, which are splayed by one or more highly branched polymers.

BACKGROUND OF THE INVENTION

Over the last decade or so, the utility of inorganic nanoparticles as additives to enhance polymer performance has been well established. Ever since the seminal work conducted at Toyota Central Research Laboratories, polymer-layered material nanocomposites have generated interest across various industries. The unique physical properties of these nanocomposites have been explored by such varied industrial sectors as the automotive industry, the packaging industry, and plastics manufacturers. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, and solvent uptake. Some of the related prior art is illustrated in U.S. Pat. Nos. 4,739,007, 4,810,734, 4,894,411, 5,102,948, 5,164,440, 5,164,460, 5,248,720, 5,854,326, and 6,034,163.

Nanocomposites can be formed by mixing polymeric materials with intercalated layered materials, which have one or more foreign molecules or parts of foreign molecules inserted between platelets of the layered material. In general, the physical property enhancements for these nanocomposites are achieved with less than 20 vol. % addition, and usually less than 10 vol. % addition of the inorganic phase, which is typically layered materials or organically modified layered materials. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The layered materials in the polymer-layered material nanocomposites are ideally thought to have three structures: (1) layered material tactoids wherein the layered material particles are in face-to-face aggregation with no organics inserted within the layered material lattice, (2) intercalated layered materials wherein the layered material lattice has been expanded to a thermodynamically defined equilibrium spacing due to the insertion of individual polymer chains, yet maintaining a long range order in the lattice, and (3) exfoliated layered materials wherein singular layered material platelets are randomly suspended in the polymer, resulting from extensive penetration of the polymer into the layered material lattice and its subsequent delamination. The greatest property enhancements of the polymer-layered material nanocomposites are expected with the latter two structures mentioned herein above.

There has been considerable effort towards developing materials and methods for intercalation and/or exfoliation of layered materials and other layered inorganic materials. In addition to intercalation and/or exfoliation, the layered material phase should also be rendered compatible with the polymer matrix in which they are distributed. The challenge in achieving these objectives arises from the fact that unmodified layered material surfaces are hydrophilic, whereas a vast number of thermoplastic polymers of technological importance are hydrophobic in nature. Although intercalation of layered materials with organic molecules can be obtained by various means, compatibilizing these splayed layered materials in a polymer matrix for uniform distribution still poses considerable difficulty. In the industry, the layered material suppliers normally provide just the intercalated layered materials and the end users are challenged to select materials and processes for compatibilizing these layered materials in the thermoplastics of their choice. This selection process involves trial and error at a considerable development cost to the end users. Since layered material intercalation and compatibilization in the matrix polymer usually involve at least two distinct materials, processes, and sites, the overall cost of the product comprising the polymer-layered material nanocomposite suffers.

A vast majority of splayed layered materials are produced by interacting anionic layered materials with cationic surfactants including onium species such as ammonium (primary, secondary, tertiary, and quaternary), phosphonium, or sulfonium derivatives of aliphatic, aromatic or arylaliphatic amines, phosphines and sulfides. These onium ions can cause intercalation in the layered materials through ion exchange with the metal cations present in the layered material lattice for charge balance. However, these surfactant molecules may degrade during subsequent melt processing, placing severe limitation on the processing temperature and the choice of the matrix polymer. Moreover, the surfactant intercalation is usually carried out in the presence of water, which needs to be removed by a subsequent drying step.

Intercalation of layered materials with a polymer, as opposed to a low molecular weight surfactant, is also known in the art. There are two major intercalation approaches that are generally used—intercalation of a suitable monomer followed by polymerization (known as in-situ polymerization, see A. Okada et. Al., *Polym Prep.*, Vol. 28, 447, 1987), or monomer/polymer intercalation from solution. Poly(vinyl alcohol) (PVA), polyvinyl pyrrolidone (PVP) and poly(ethylene oxide) (PEO) have been used to intercalate the layered material platelets with marginal success. As described by Levy et. al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite layered material platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of poly(vinyl alcohol) by montmorrilonite", *Journal of Colloid Science*, Vol. 18, 647–664 (1963) discloses that sorption of PVA on the montmorillonite was dependent on the concentration of PVA in the solution. It was found that sorption was effective only at polymer concentrations of the order of 1% by weight of the polymer. No further effort was made towards commercialization since it would be limited by the drying of the dilute splayed layered materials. In a recent work by Richard Vaia et.al., "New Polymer Electrolyte Nanocomposites: Melt intercalation of polyethyleneoxide in mica type silicates", *Adv. Materials,* 7(2), 154–156, 1995, PEO was splayed into Na-montmorillonite and Li-montmorillonite by heating to 80° C. for 2–6 hours to achieve a d-spacing of 17.7° A. The extent of intercalation observed was identical to that obtained from solution (V. Mehrotra, E. P. Giannelis, *Solid State Commun.,* 77, 155, 1991). Other, recent work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly, U.S. Pat. No. 5,880,197 discusses the use of an intercalating monomer that contains an amine or amide functionality or mixtures thereof. In both these patents, and other patents issued to the same group, the intercalation is performed at very dilute layered material concentrations in a medium such as water, leading to a necessary and costly drying step, prior to melt processing.

In order to further facilitate delamination and prevent reaggregation of the layered material particles, these splayed layered materials are required to be compatible with the matrix polymer in which they are to be incorporated. This can be achieved through the careful selection and incorporation of compatibilizing or coupling agents, which consist of a portion which bonds to the surface of the layered materials and another portion which bonds or interacts favorably with the matrix polymer. The choice of the compatibilizing agent is very much dependent on the matrix polymer as well as the specific component used to intercalate the layered materials, since the compatibilizer has to act as a link between the two. Compatibility between the matrix polymer and the layered material particles ensures a favorable interaction, which promotes the dispersion of the splayed layered materials in the matrix polymer. Effective compatibilization leads to a homogenous dispersion of the layered material particles in the typically hydrophobic matrix polymer and/or an improved percentage of exfoliated or delaminated layered materials. Typical agents known in the art include general classes of materials such as organosilane, organozirconate and organotitanate coupling agents.

A survey of the art, makes it clear that there is a lack of general guideline for the selection of the intercalating and compatibilizing agents for a specific matrix polymer and layered material combination. Even if one can identify these two necessary components through trial and error, they are usually incorporated as two separate entities, usually in the presence of water followed by drying, in a batch process and finally combined at a separate site with the matrix polymer during melt processing of the nanocomposite. Such a complex process obviously adds to the cost of development and manufacturing of the final product comprising such a nanocomposite. There is a critical need in the art for a comprehensive strategy for the development of better materials and processes to overcome some of the aforementioned drawbacks.

Imaging elements such as photographic elements usually comprise a flexible thermoplastic base on which is coated the imaging material such as the photosensitive material. The thermoplastic base is usually made of polymers derived from the polyester family such as polyethylene terephthalate (PET), polyethylene naphthalate (PEN) and cellulose triacetate (TAC). Films for color and black and white photography and motion picture print film are examples of imaging media comprising such flexible plastic bases in roll form. TAC has attributes of high transparency and curl resistance after processing but poor mechanical strength. PET on the other hand has excellent mechanical strength and manufacturability but undesirable post process curl. The two former attributes make PET more amenable to film thinning, enabling the film to have more frames for the same length of film. Thinning of the film however causes loss in mechanical strength. The stiffness will drop as approximately the cube root of the thickness of the film. Also, a photosensitive material coated on the base in a hydrophilic gelatin vehicle will shrink and curl towards the emulsion when dry. There is hence a need for a base that is thinner yet stiff enough to resist this stress caused by contraction forces. Films may also be subjected to excursions to high temperatures during use. A transparent film base that has dimensional stability at high temperatures due to its higher heat capacity is also highly desirable.

Highly branched polymers such as dendrimers and hyperbranched polymers are newly developed materials and have many important applications. Compared with linear polymers, highly branched polymers provide some unique advantages (Frechet, et al. Science, 269, 1080, 1995).

SUMMARY OF THE INVENTION

It is an object of the invention to provide a splayed material. It is a further object of the invention to provide a splayed material which further comprises a component compatible with a matrix in which the splayed material can be dispersed. It is an even further object of the invention to provide an article comprising a matrix and a splayed material wherein said splayed material comprises a matrix compatible component.

These and other objects of the invention are accomplished by a splayed material comprising a layered material splayed with a highly branched polymer. A further embodiment of the invention includes an article comprising a matrix and a layered material splayed with a highly branched polymer, as well as a material exfoliated with a highly branched polymer.

The invention has numerous advantages. It provides a splayed material, which can be effectively incorporated into a polymer-layered material nanocomposite. Such polymer-layered material nanocomposites can be incorporated into an article of engineering application with improved physical properties such as modulus, tensile strength, toughness, impact resistance, electrical conductivity, heat distortion temperature, coefficient of linear thermal expansion, fire retardance, oxygen and water vapor barrier properties, and the like. The application of such articles in a number of industrial sectors, such as automotive, packaging, battery, cosmetics, aerospace, etc. have been elucidated in the literature (vide, for example, "Polymer-layered material Nanocomposites," Ed. T. J. Pinnavia and G. W. Beall, John Wiley & Sons, Ltd. Publishers).

The invention has an additional advantage of intercalating/exfoliating the layered materials with a highly branched polymer wherein the bridging of the matrix polymer and layered materials can be readily achieved. The highly branched polymer may have multiple functionalities. Some functional groups of these highly branched polymer are hydrophilic and have a natural affinity to the layered material surface, resulting in the ability to readily enter the layered material lattice and intercalate the layered materials. The aforesaid highly branched polymer may further comprise a structural unit compatible with another host polymer, to which the splayed material is added. A multi-component or multifunctional highly branched polymer ensures that a component of the hyperbranched polymer will intercalate/exfoliate the layered material and another component or attached functional groups will physically or chemically compatibilize the splayed layered materials with a hydrophobic matrix polymer. Thus, two necessary criteria of effectively dispersing layered materials in a polymer to form a desirable polymer-layered material nanocomposite, namely layered material intercalation/exfoliation and compatibilization, can be fulfilled by the choice of the functional groups or blocks in hyperbranched polymers of this invention.

One drawback in utilizing conventional organo layered material is their poor thermal stability. Because the intercalant in the organo layered material is a small molecular or oligomer species, the splayed material exhibits weight loss and color change, which indicates the degradation of the intercalant at above 200° C. While the processing conditions of most commodity polymers are at 200° C. to 300° C., this degradation will lead to an inferior material, poor optical characteristic of end product, and additional degradation of the matrix polymer due to the degradation of the intercalant. On the other hand, the splayed material of this invention has good thermal stability, resulting in superior composite materials.

The splayed materials of this invention are also advantageous in processing versatility. The highly branched polymer splayed materials were found to exhibit good solubility as well as melting characteristic. The splayed materials can be incorporated into composite material either through solution process or melt process. This leads to broad application in paint, thermal plastics, coatings and different applications of polymers.

Another advantage of the invention derives from the fact that the layered material, the highly branched polymer and the matrix polymer can all be combined in a single step in a suitable compounder, thus, adding greatly to the efficiency of the manufacturing process.

Additionally, the present invention teaches a general strategy wherein the chemistry of the highly branched polymer can be tailored according to the choice of the layered material and the specific matrix polymer. The molecular weights can be controlled easily to meet the processing conditions, such as temperature, shear, viscosity and product needs, such as various physical properties.

These and other advantages will be apparent from the detailed description below.

DETAILED DESCRIPTION OF THE INVENTION

Figure 1:
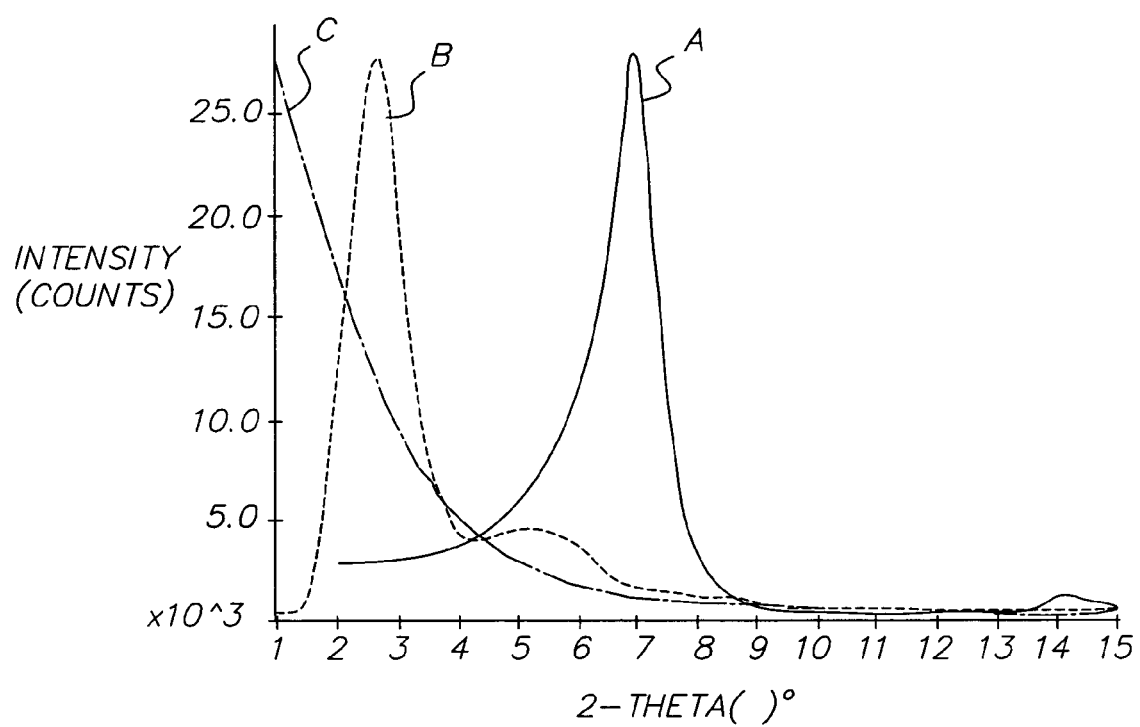
FIG. 1 illustrates XRD patterns for (A) L1, (B) P1 to L1 at a ratio of 50:50, as in Example 9 and (C) P1 to L1 at a ratio of 90:10, as in Example 6.

Whenever used in the specification the terms set forth shall have the following meaning:

"Nanocomposite" shall mean a composite material wherein at least one component comprises an inorganic phase, such as a smectite layered material, with at least one dimension in the 0.1 to 100 nanometer range.

"Plates" shall mean particles with two comparable dimensions significantly greater than the third dimension, e.g., length and width of the particle being of comparable size but orders of magnitude greater than the thickness of the particle.

"Layered material" shall mean an inorganic material such as a smectite layered material that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5—line 23, col. 7).

"Intercalant" shall mean the aforesaid foreign molecule inserted between platelets of the aforesaid layered material.

"Intercalated" shall refer to layered material that has at least partially undergone intercalation and/or exfoliation.

"Exfoliation" or "delamination" shall mean separation of individual platelets in to a disordered structure, without any stacking order.

"Organo layered material" shall mean layered material modified by organic molecules.

"Splayed" layered materials are defined as layered materials which are completely intercalated with no degree of exfoliation, totally exfoliated materials with no degree of intercalation, as well as layered materials which are both intercalated and exfoliated including disordered layered materials.

"Splaying" refers to the separation of the layers of the layered material, which may be to a degree which still maintains a lattice-type arrangement, as in intercalation, or to a degree which spreads the lattice structure to the point of loss of lattice structure, as in exfoliation.

Highly branched polymers have several special and unique features. First, the intrinsic viscosity of a dendrimer is lower when compared with linear analogs with the same molecular weight. Second, the level of interaction between solvent and polymer is decreased and the polymer becomes much more compact. Third, if the functional groups are located at the end of the polymer, the functional groups becomes more accessible and occupy a much higher surface area. We conceptualized that these unique features in highly branched polymers might be advantageous in intercalating or even exfoliating the layered inorganic particulates. Also, the use of highly branched polymers containing splayed inorganic particles may enhance compatibility of the polymer matrix and the nanocomposite elements.

Any highly branched polymer that is made from a one pot process, such as a hyperbranched polymer, or from a multi-step process, such as a dendrimer, may be used in the invention. Any highly branched polymer with various topologies and compositions may be used in the invention. Any highly branched polymer can be a segment of a copolymer. Such topologies and compositions include, but are not limited to homo highly branched, random highly branched, block highly branched, graft highly branched, and star highly branched.

A highly branched polymer is characterized by a structure having "branch upon branch upon branch . . .". Depending on the regularity of its organization and the type of branched involved, three different classes of highly branched polymers can be used in present invention. They include: (a) hyperbranched, also know as randomly branched, polymers, (b), dendritic grafted dendrigrafts or combburst, and (c) dendritic branched dendrons and dendrimers. The term "highly branched" is used herein with respect to branched polymers and includes both hyperbranched and dendrimer structures. The term is intended to designate polymers having a relatively high percentage of propagated branching sites per number of polymerized monomer units, e.g., at least one branching site per every ten monomer units, preferably at least one branching site per every five monomer units, and more preferably, at least one branching site per every two monomer units. Hyperbranched polymers, a sub-group of highly branched polymers are characterized by irregular branching, having a branch every 1 to 10 repeating units. Dendritic polymers, or dendrimers, another sub-group of highly branched polymers, are more regular branching in structure, with a branch every repeating group or unit.

In general, dendritic grafted dendrigrafts or combburst and dendritic branched dendrons and dendrimers can be made by multiple steps, as in convergent and divergent processes. Examples include, but are not limited to, dendritic polyaminoamines (Tomalia, et al. U.S. Pat. Nos 4,435,548, 4,507,466, 4,558,120, 4,737,550), cascade polyamides (Newkome, et al. U.S. Pat. Nos. 5,376,690, 5,422,379), polyether (Hawker et al. J. Am. Chem. Soc., 112, 7638 (1990)), and polysiloxane (Uchida,. J. Am. Chem. Soc., 112, 7077 (1990)).

In general, hyperbranched polymers used in the present invention can be made through chain polymerization or condensation polymerization processes, as described in J. Polym. Sci., Part A: Polym. Chem. 36, 1685–1698 (1998), the disclosure of which is hereby incorporated by reference. In one embodiment, the hyperbranched polymer used in the present invention can be made through the polymerization of $A_n$-$R^1$—$B_m$ monomers, wherein n and m are integers of at least 1 and $R^1$ represents a linking group between A and B or co-polymerization of $A_s$+$B_t$ co-monomer pairs wherein s and t are integers of at least 2 and of at least 3, respectively, as described in U.S. Pat. Nos. 4,857,630, and 6,353,082 and co-pending 6,525,170, 6,541,599, and 6,541,600, the disclosures of which are hereby incorporated by reference.

In a preferred embodiment, the hyperbranched polymer used in the invention is a polyamide, polyester, polyether, vinylic polymer, polyimine, polysiloxane, polyurethane, polythioether, polyarylalkylene, polysilane, polycarbonate, polysulfone, polyimide, polyesterimide, or polyesteramide.

In another preferred embodiment of the invention, the hyperbranched polymer is prepared by a chain polymerization of a monomer of the formula $M^1{}_n$-$R^1$-$M^2{}_m$ wherein (i) $R^1$ is a substituted or non-substituted straight, cyclic or branched alkyl, straight, cyclic or branched alkenyl, or straight, cyclic or branched aryl moiety and hetero atom containing substituted or non-substituted straight, cyclic or branched alkyl, straight, cyclic or branched alkenyl, or straight, cyclic or branched aryl moiety, (ii) $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source, and (iii), n and m are integers of at least 1, more preferably n is 1 and m is 1 or 2, most preferably n is 1 and m is 1.

In another preferred embodiment of the invention, the hyperbranched polymer is prepared by a condensation or addition polymerization of a monomer of the formula $M^3{}_s$-$R^1$-$M^4{}_t$, wherein (i) $R^1$ is defined above, (ii), $M^3$ and $M^4$ are groups that undergo a condensation or addition reaction with or without a catalyst, and (iii), s is an integer of at least 1 and t at least 2, more preferably s is 1 and t is 2 to 4, and most preferably s is 1 and t is 2.

In another preferred embodiment of the invention, hyperbranched polymer is prepared by a condensation or addition polymerization of a co-monomer pair of the formula $R^2$-$M^5{}_x$ and $R^3$-$M^6{}_y$, wherein (i) $R^2$ and $R^3$ are each dependently substituted or non-substituted straight, cyclic or branched alkyl, straight, cyclic or branched alkenyl, or straight, cyclic or branched aryl moiety or hetero atom containing substituted or non-substituted straight, cyclic or branched alkyl, straight, cyclic or branched alkenyl, or straight, cyclic or branched aryl moiety, (ii), $M^5$ and $M^6$ are groups that undergo a condensation or addition reaction, and (iii), x is an integer of at least 2 and y an integer of at least 3, more preferably x is 2 and 4 and y is 3 to 10, and most preferably x is 2 and y is 3.

In another preferred embodiment of the invention, $M^1$ is a non-substituted or substituted vinylic group or epoxy, and $M^2$ is X, —$CH_2X$, —$CH(CH_3)X$, —$C(O)CH_2X$, —$C(O)CHX_2$, —$C(O)CX_3$, —$OC(O)CH_2X$, —$OC(O)CHX_2$, or —$OC(O)CX_3$ wherein X is Cl, Br, I, S—C(=S)—$NR^4R^5$, S—C(=S)—$OR^4$, —O—$NR^4R^5$, OH or

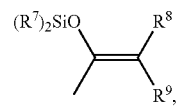

wherein $R^4$ and $R^5$ are each independently —$(CH_2)_r$—, —$C_6H_5$, —C(O)O or —C(O), unless $R^5$ is terminal, wherein the terminal $R^5$ also includes a hydrogen, aryl or alkyl group, $R^7$, $R^8$ and $R^9$ are each independently a linear or branched alkyl or aromatic group, and r=1–12.

In another preferred embodiment of the invention, $M^3$ and $M^4$ are each independently —COOH, —OH, —$OSi(CH_3)_3$, $OCOCH_3$, —C(O)Cl,

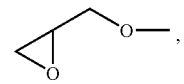

anhydride, NH, or $NH_2$.

In another preferred embodiment of the invention, $M^5$ and $M^6$ are each independently —COOH, —OH, —$OSi(CH_3)_3$, $OCOCH_3$, —C(O)Cl, epoxy, anhydride, —NH, —$NH_2$ or

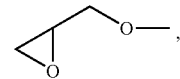

$R^2$ is —$C_6H_3$— or —$(CH_2)_q$—$C(R^6)$—, wherein $R^6$ is a linear or branched alkyl or aromatic group, q is 1–6, and $R^3$ is —$C_6H_4$—, —$C_6H_4$—O—$C_6H_4$—, —$C_6H_3$, —$N(CH_2)_3$, —$C_4H_8$—, —$C_6H_{10}$—,

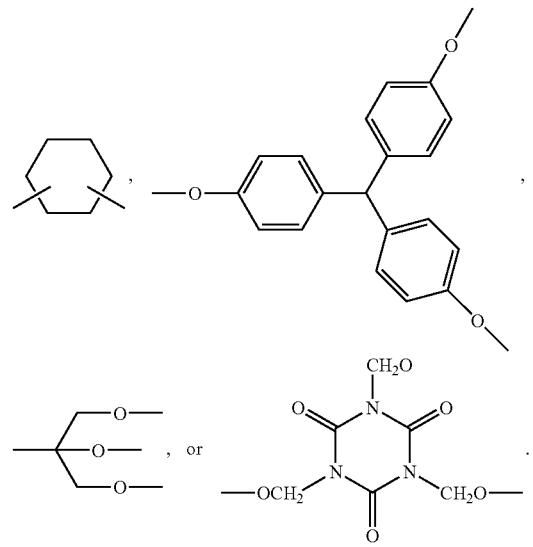

In still another embodiment of the invention, $R^1$, $R^2$, and $R^3$ are each independently an oligomeric or polymeric chain of a polyamide, polyester, polyether, vinylic polymer, polyimine, polysiloxane, polyurethane, polythioether, polyarylalkylene, polysilane, polycarbonate, polysulfone, polyimide, polyesterimide, or polyesteramide.

Examples of $M^1$-$R^1$-$M^2_m$ include:

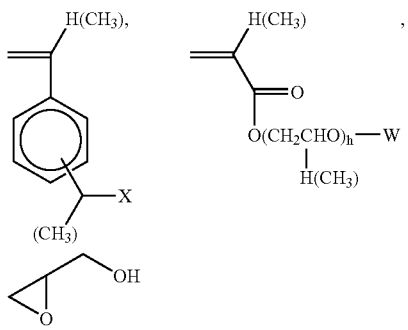

wherein h is an integer of at least 1, W is —C(O)CH$_2$X, —C(O)CHX$_2$ or —C(O)CX$_3$, and X is Cl, Br, I,

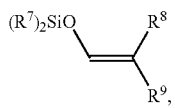

S—C(=S)—Z (Z=R4, O R4, N R4 R5), S—C(=S)—Z (Z=$R^4$, O $R^4$, N $R^4$ $R^5$), or O—NR$^4$R$^5$, where $R^4$ and $R^5$ are defined as above, and $R^7$, $R^8$ and $R^9$ are each independently a linear or branched alkyl or aromatic group.

Examples of $M^3_s$-$R^1$-$M^4_t$ include 2,2-bis(hydroxymethyl)propionic acid, 2,3-diaminoproponic acid, 2,5-diaminopentanoic acid, 1-Lysine and other ones having the following structure:

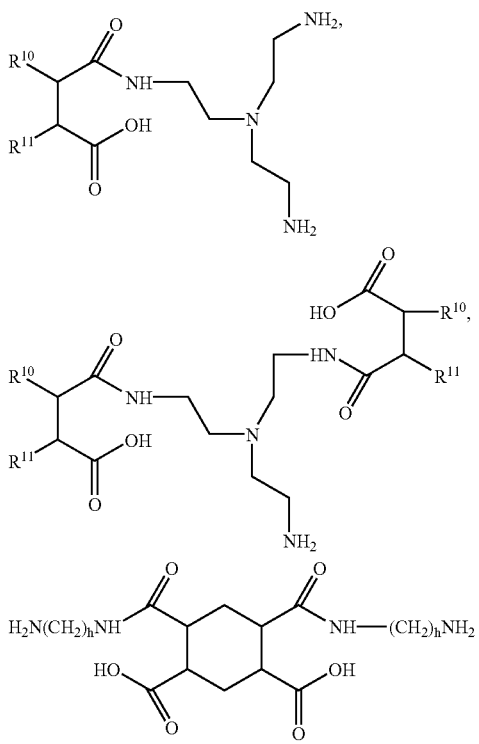

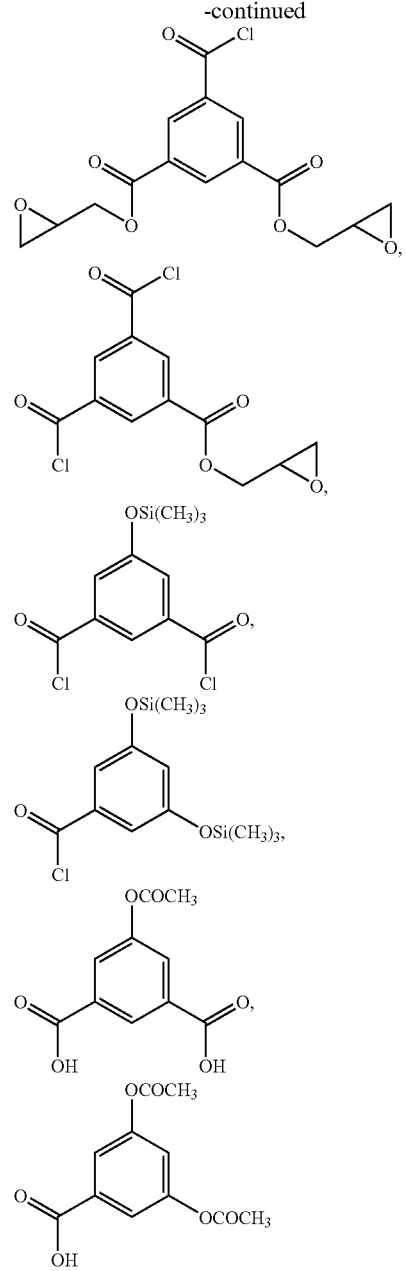

wherein $R^{10}$ and $R^{11}$ are independently H, substituted or non-substituted straight or branched alkyl, alkenyl, aryl moiety and may be joined to form an alkylene group, 3 to 8-membered ring, h is defined above.

Examples of $R^2$-$M^5_x$ and $R^3$-$M^6_y$ include Jeffamines, diaminohexane, 3,3'-diamino-N-methylpropylamine, 1,4-phenylenediamine, 4,4'-oxydianiline, succinic acid, adipic acid, 1,4-cyclohexanedicarboxilic acid, terephthalic acid, 4,4'-oxybis(benzoic acid), 2-aminoterephtalic acid, tris(2-aminoethyl)amine, trimesic acid, maleic anhydride, succinic anhydride, hexahydrophthalic anhydride, phthalic anhydride, glutaric anhydride, octenyl anhydride, decanyl anhydride, 2-dodecenyl-1-ylsuccinic anhydride, octen-1-ylsuccinic anhydride, 1,2,3,4-cyclopentane-tetra-carboxylic dianhydride, diethanolamine, diisopropanolamine, 1,2,7,8-diepoxyoctane, 1,1,1-tris(hydroxylmethyl)ethane, triethanolamine, diglycidyl-1,2-cyclohexanedicaboxylate, diglycidyl-1,2,3,6-tetrahydrophtalate, poly(propyleneglycol) diglycidyl ether, poly(dimethylsiloxane) diglycidyl ether, bisphenol A propoxylate (1PO/phenol) diglycidyl ether, bis (4-glycidyloxyphenyl)methane, resorcinol diglycidyl ether, diglycidyl aniline, triphenylolmethane tridiglycidyl ether, trimethylolpropane tridiglycidyl ether, N,N-diglycidyl-4-glycidyloxybenzene, tris-2(2,3-epoxypropyl)isocyanurate, terephthaloyl chloride, 1,3,5-benzenetricarbonyl trichloride, aminopropyl terminated polydimethylsiloxanes with molecular weight from 800 to 300,000, and aminopropyl methylsiloxane-dimethylsiloxane copolymers with molecular weight from 4,000 to 5,000 and molar percentage of aminopropyl methylsiloxane from 2 to 7.

In a preferred embodiment of the invention, the soluble or dispersible hyperbranched polymer possesses water soluble or dispersible segment groups either at the ends thereof or in the backbone. These water soluble or dispersible segments or groups can be introduced by either direct polymerization or by post-modification of the hyperbranched polymer. The water soluble or water dispersible segments or groups may be cationic, anionic, and non-charged. The anionic segments or groups may be carboxylic acids and their salts, sulfonic acid and their salts, or phosphonic acid and their salts. The cationic segments or groups may be N, P, and S containing quaternized onium salts. Finally, the non-charged segments or groups may be —OH, polyether, substituted or non-substitute amines.

The molecular weights of highly branched is between about 300 and 10,000,000. The most preferred molecular weight range for the present invention is between 1,000 and 1,000,000. The numbers of end functional group is from 2 to 1,000,000. The preferred molecular weight ranges and numbers of functional groups are chosen to ensure ease of synthesis and processing under a variety of conditions.

The layered materials most suitable for this invention include materials in the shape of plates with significantly high aspect ratio. However, other shapes with high aspect ratio will also be advantageous. The layered materials suitable for this invention comprise clays or non-clays. These materials include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the layered materials named above. Other useful layered materials, particularly useful with anionic matrix polymers, are the layered double hydroxide clays or hydrotalcites, such as $Mg_6Al_{3\ 4}(OH)_{18\ 8}(CO_3)_{1.7}H_2O$, which have positively charged layers and exchangeable anions in the interlayer spaces. Other layered materials having little or no charge on the layers may be useful provided they can be splayed with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3\text{—}H_2O$, $MnHAsO_4\text{—}H_2O$, $Ag_6Mo_{10}O_{33}$ and the like. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in the literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include clays, especially smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite and hydrotalcites, because of commercial availability of these materials.

The aforementioned layered materials can be natural or synthetic, for example, synthetic smectite layered materials. This distinction can influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation. For this invention, the clay particles should have a lateral dimension of between 0.01 µm and 5 µm, and preferably between 0.05 µm and 2 µm, and more preferably between 0.1 µm and 1 µm. The thickness or the vertical dimension of the clay particles can vary between 0.5 nm and 10 nm, and preferably between 1 nm and 5 nm. The aspect ratio, which is the ratio of the largest and smallest dimension of the layered material particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention can be an organoclay. Organoclays may be produced by interacting the unfunctionalized clay with suitable intercalants. These intercalants may be typically organic compounds, which may be neutral or ionic. Useful neutral organic molecules include polar molecules such as amides, esters, lactams, nitriles, ureas, carbonates, phosphates, phosphonates, sulfates, sulfonates, nitro compounds, and the like.

The neutral organic intercalants can be monomeric, oligomeric or polymeric. Neutral organic molecules can cause intercalation in the layers of the layered materials through hydrogen bonding, without completely replacing the original charge balancing ions. Useful ionic compounds may be cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

The matrix polymer of the invention can be any natural or synthetic polymer. The matrix polymer may also be any water soluble or insoluble polymer. The water soluble polymers preferred include gelatin, poly(vinyl alcohol), poly (ehtylene oxide), polyvinylpyrolidinone, poly(acrylic acid), poly(styrene sulfonic acid), polyacrylamide, and quaternized polymers.

The matrix polymer may be a thermoplastic resin. Illustrative of useful thermoplastic resins are polylactones such as poly(pivalolactone), poly(caprolactone) and the like, polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4' diphenylmethane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like, and linear long-chain diols such as poly(tetramethylene adipate), poly(ethylene adipate), poly(1,4-butylene adipate), poly(ethylene succinate), poly(2,3-butylenesuccinate), polyether diols and the like, polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl) propane) carbonate, and the like, polysulfones, polyether ether ketones, polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomex®), poly(p-phenylene terephthalamide)(Kevlar®), and the like, polyesters such as poly(ethylene azelate), poly(ethylene-1,5-naphthalate), poly(ethylene-2,6-naphthalate), poly(1,4-cyclohexane dimethylene terephthalate), poly (ethylene oxybenzoate) (A-Tell®), poly(para-hydroxy benzoate) (Ekonol®), poly(1,4-cyclohexylidene dimethylene terephthalate) (Kodel®) (cis), poly(1,4-cyclohexylidene dimethylene terephthalate) (Kode®1) (trans), polyethylene terephthlate, polybutylene terephthalate and the like, poly (arylene oxides) such as poly(2,6-dimethyl-1,4-phenylene oxide), poly(2,6-diphenyl-1,4-phenylene oxide) and the like, poly(arylene sulfides) such as poly(phenylene sulfide) and the like, polyetherimides, vinyl polymers and their copolymers such as poly(vinyl acetate), poly(vinyl alcohol), poly (vinyl chloride), poly(vinyl butyral), poly(vinylidene chloride), ethylene-vinyl acetate copolymers, and the like, polyacrylics, polyacrylate and their copolymers such as poly(ethyl acrylate), poly(n-butyl acrylate), poly(methylmethacrylate), poly(ethyl methacrylate), poly(n-butyl methacrylate), poly(n-propyl methacrylate), poly(acrylamide), polyacrylonitrile, poly(acrylic acid), ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like, polyolefins such as (linear) low and high density poly(ethylene), poly(propylene), chlorinated low density poly(ethylene), poly(4-methyl-1-pentene), poly(ethylene), poly(styrene), and the like, ionomers, poly(epichlorohydrins), poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like, and polysulfones such as the reaction product of the sodium salt of 2,2-bis(4-hydroxyphenyl) propane and 4,4'-dichlorodiphenyl sulfone, furan resins such as poly(furan), cellulose ester plastics such as cellulose acetate, cellulose acetate butyrate, cellulose propionate and the like, silicones such as poly(dimethyl siloxane), poly(dimethyl siloxane), poly(dimethyl siloxane co-phenylmethyl siloxane), and the like, protein plastics, polyethers, polyimides, polyvinylidene halides, polycarbonates, polyphenylenesulfides, polytetrafluoroethylene, polyacetals, polysulfonates, polyester ionomers, polyolefin ionomers. Copolymers and/or mixtures of these aforementioned polymers can also be used.

Vulcanizable and thermoplastic rubbers useful in the practice of this invention may also vary widely. Illustrative of such rubbers are brominated butyl rubber, chlorinated butyl rubber, polyurethane elastomers, fluoroelastomers, polyester elastomers, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly (sulfide) elastomers, block copolymers, made up of segments of glassy or crystalline blocks such as poly(styrene), poly(vinyl-toluene), poly(t-butyl styrene), polyester and the like and the elastomeric blocks such as poly(butadiene), poly(isoprene), ethylene-propylene copolymers, ethylene-butylene copolymers, polyether ester and the like as for example the copolymers in poly(styrene)-poly(butadiene)-poly(styrene) block copolymer manufactured by Shell Chemical Company under the trade name of Kraton®. Copolymers and/or mixtures of these aforementioned polymers can also be used. Preferred matrix polymers for the present invention are thermoplastic polymers such as polyamides, polyesters, and polymers of alpha-beta unsaturated monomers and copolymers.

Polyamides, which may be used in the present invention, are synthetic linear polycarbonamides characterized by the presence of recurring carbonamide groups as an integral part of the polymer chain, which are separated from one another by at least two carbon atoms. Polyamides of this type include polymers, generally known in the art as nylons, obtained from diamines and dibasic acids having the recurring unit represented by the general formula:

—NHCOR$^1$COHNR$^2$— in which R$^1$ is an alkylene group of at least 2 carbon atoms, preferably from about 2 to about 11 or arylene having at least about 6 carbon atoms, preferably about 6 to about 17 carbon atoms, and R$^2$ is selected from R$^1$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly (hexamethylene sebacamide) (nylon 6,10), poly(hexamethylene isophthalamide), poly(hexamethylene terephthalamide), poly(heptamethylene pimelamide) (nylon 7,7), poly (octamethylene suberamide) (nylon 8,8), poly (nonamethylene azelamide) (nylon 9,9), poly (decamethylene azelamide) (nylon 10,9), poly(decamethylene sebacamide) (nylon 10,10), poly(bis(4-amino cyclohexyl)methane-1,10-decane-carboxamide)), poly(m-xylylene adipamide), poly(p-xylene sebacamide), poly(2,2,2-trimethyl hexamethylene terephthalamide), poly(piperazine sebacamide), poly(p-phenylene terephthalamide), poly (metaphenylene isophthalamide) and the like.

Other useful polyamides may be those formed by the polymerization of amino acids and derivatives thereof as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-amino-decanoic acid) (nylon 10), poly(11-aminoundecanoic acid) (nylon 11), poly (12-aminododecanoic acid) (nylon 12) and the like.

Preferred polyamides for use in the practice of this invention include poly(caprolactam), poly(12-aminododecanoic acid), poly(hexamethylene adipamide), poly(m-xylylene adipamide), and poly(6-aminohexanoic acid) and copolymers and/or mixtures thereof, for their widespread application and effectiveness in the present invention.

Other polymers, which may be employed in the practice of this invention, are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties may be suitable for use in this invention.

The particular polyester chosen for use can be a homopolyester or a co-polyester, or mixtures thereof as desired. Polyesters may be normally prepared by the condensation of an organic dicarboxylic acid and organic diols. Illustrative examples of useful polyesters will be described herein below in terms of these diol and dicarboxylic acid precursors.

Polyesters which may be suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of this invention are poly(ethylene terephthalate), poly(cyclohexlenedimethylene) terephthalate, poly(ethylene dodecate), poly(butylene terephthalate), poly(ethylene naphthalate), poly(ethylene(2, 7-naphthalate)), poly(methaphenylene isophthalate), poly (glycolic acid), poly(ethylene succinate), poly(ethylene adipate), poly(ethylene sebacate), poly(decamethylene azelate), poly(ethylene sebacate), poly(decamethylene adipate), poly (decamethylene sebacate), poly(dimethylpropiolactone), poly(para-hydroxybenzoate) (Ekonol®), poly(ethylene oxybenzoate) (A-tell®), poly(ethylene isophthalate), poly(tetramethylene terephthalate, poly(hexamethylene terephthalate), poly(decamethylene terephthalate), poly(1,4-cyclohexane dimethylene terephthalate) (trans), poly (ethylene 1,5-naphthalate), poly(ethylene 2,6-naphthalate), poly(1,4-cyclohexylene dimethylene terephthalate), (Kodel®) (cis), and poly(1,4-cyclohexylene dimethylene terephthalate (Kodel®) (trans).

Polyester compounds prepared from the condensation of a diol and an aromatic dicarboxylic acid are preferred for use in this invention. Illustrative of such useful aromatic carboxylic acids are terephthalic acid, isophthalic acid, o-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Of these preferred acid precursors, terephthalic acid is a particularly preferred acid precursor because it leads to polyesters that are less prone to degradation during melt processing and more dimensionally stable.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred, because of its excellent mechanical strength, manufacturability, and effectiveness in the present invention.

Another set of useful thermoplastic polymers may be formed by polymerization of alpha-beta-unsaturated monomers of the formula:

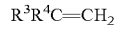

$R^3R^4C{=}CH_2$ wherein: $R^3$ and $R^4$ are the same or different and are cyano, phenyl, carboxy, alkylester, halo, alkyl, alkyl substituted with one or more chloro or fluoro, or hydrogen. Illustrative of such preferred polymers are polymers of ethylene, propylene, hexene, butene, octene, vinylalcohol, acrylonitrile, vinylidene halide, salts of acrylic acid, salts of methacrylic acid, tetrafluoroethylene, chlorotrifluoroethylene, vinyl chloride, styrene and the like. Copolymers and/or mixtures of these aforementioned polymers can also be used in the present invention.

Preferred thermoplastic polymers formed by polymerization of alpha-beta-unsaturated monomers for use in the practice of this invention are poly(propylene), poly(ethylene), poly(styrene) and copolymers and/or mixtures thereof, with poly(propylene) polymers and copolymers being most preferred for their low cost and good mechanical and surface properties.

Another set of synthetic polymers useful as matrix polymers for the present invention includes thermoset polymer materials such as polyesters, unsaturated polyesters, alkyds, phenolic polymers, amino plastics, epoxy resins, polyurethanes, and polysulfides.

The layered materials and the highly branched polymers of the invention can be interacted for intercalation/exfoliation by any suitable means known in the art of making nanocomposites. The order and the method of addition of layered material, highly branched polymer, and optional addenda can be varied.

In a preferred embodiment, the layered materials can be dispersed in suitable branching monomers or oligomers, which are subsequently hyperbranching polymerized. In another preferred embodiment, the layered materials can be melt blended with the highly branched polymer at temperatures preferably comparable to the polymer melting point or above, with or without shear. In still another preferred embodiment, the layered materials and the highly branched polymer can be combined in a solvent phase to achieve intercalation/exfoliation. The resultant solution or dispersion can be used as is or with solvent removal through drying. The solvent can be aqueous or organic. The organic solvent can be polar or nonpolar.

The material of the instant invention comprising the layered materials, and the highly branched polymer together with any optional addenda, can be formed by any suitable method such as, extrusion, co-extrusion with or without orientation by uniaxial or biaxial, simultaneous or consecutive stretching, blow molding, injection molding, lamination, solvent casting, and the like.

The optional addenda mentioned herein above can include, but are not limited to, nucleating agents, fillers, plasticizers, impact modifiers, chain extenders, colorants, lubricants, antistatic agents, pigments such as titanium oxide, zinc oxide, talc, calcium carbonate, dispersants such as fatty amides, (e.g., stearamide), metallic salts of fatty acids, e.g., zinc stearate, magnesium stearate, dyes such as ultramarine blue, cobalt violet, antioxidants, fluorescent whiteners, ultraviolet absorbers, fire retardants, roughening agents, cross linking agents, voiding agents and the like. These optional addenda and their corresponding amounts can be chosen according to need.

The weight ratio of the layered materials to highly branched polymer can vary from 0.1:99.9 to 99.9:0.1. However it is preferred to be between 90:10 to 50:50 and more preferred to be between 80:20 and 60:40 in order to optimize the desirable physical properties of layered materials and the intercalation/exfoliation afforded by the highly branched polymer.

The layered materials and the highly branched polymer of the invention can be further interacted with matrix polymers by any suitable means known in the art of making nanocomposites. The order and method of addition of layered material, highly branched polymer, matrix, and optional addenda can be varied.

In a preferred embodiment, the layered materials can be initially mixed with a suitable highly branched polymer followed by mixing with a matrix. In another preferred embodiment, the layered materials can simultaneously be mixed with a suitable highly branched polymer and a matrix. In another preferred embodiment, the layered materials and highly branched polymer can be dispersed in suitable matrix monomers or oligomers, which are subsequently polymerized by step or chain polymerization. In still another preferred embodiment, the layered material splayed by a highly branched polymer can be one of the monomers which can participate in polymerization to form the composite with the matrix. In another preferred embodiment, the layered materials can be melt blended with the highly branched polymer at temperatures preferably comparable to the polymer melting point or above, with or without shear, followed by mixing with a matrix at temperatures preferably comparable to the polymer and matrix melting points or above, with or without shear. In another preferred embodiment, the layered materials can be melt blended with the highly branched polymer and matrix at temperatures preferably comparable to the polymer and matrix melting points or above, with or without shear. In another preferred embodiment, the layered materials and the highly branched polymer can be combined in a solvent phase to achieve intercalation/exfoliation followed by mixing with a matrix. The resultant solution or dispersion can be used as is or with solvent removal through drying. The solvent can be aqueous or organic. The organic solvent can be polar or nonpolar. In yet another preferred embodiment, the layered materials, the highly branched polymer, and the matrix can be combined in a solvent phase to achieve intercalation/exfoliation. The resultant solution or dispersion can be used as is or with solvent removal through drying. The solvent can be aqueous or organic. The organic solvent can be polar or nonpolar.

The weight ratio of the splayed material (layered material/highly branched) to polymer matrix can vary from 0.1:99.9 to 99.9:0.1. However it is preferred to be between 1:99 to 90:10 in order to optimize the desirable physical properties of the nanocomposite.

For the practice of the present invention, it is important to ensure compatibility between the matrix polymer and at least part of highly branched polymer used for layered material intercalation or exfoliation. If the matrix polymer comprises a blend of polymers, the polymers in the blend should be compatible with at least part of highly branched polymer used for layered material splaying. If the matrix polymer comprises copolymer(s), the copolymer(s) should be compatible with at least part of highly branched polymer used for layered material splaying.

The article of the instant invention comprising the layered materials, the highly branched polymer and the polymer matrix, together with any optional addenda, can be formed by any suitable method such as, extrusion, co-extrusion with or without orientation by uniaxial or biaxial, simultaneous or consecutive stretching, blow molding, injection molding, lamination, solvent casting, and the like.

In a preferred embodiment of the invention the layered material, together with any optional addenda, is melt blended with the highly branched polymer of the invention in a suitable twin screw compounder, to ensure proper mixing. An example of a twin screw compounder used for the experiments detailed below is a Leistritz Micro® 27. Twin screw extruders are built on a building block principle. Thus, the mixing of additives, the residence time of resin, as well as the point of addition of additives can be easily changed by changing the screw design, the barrel design and the processing parameters. Other compounding machines for use in preparing the present invention include, but are not limited to twin screw compounders manufactured by Werner and Pfleiderrer, and Berstorff. These compounders can be operated either in the co-rotating or the counter-rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives, the screw design needs to be appropriately configured.

The preferred mode of addition of layered materials to the highly branched polymer is through the use of the side stuffer to ensure the splaying of the layered materials through proper viscous mixing and to ensure dispersion of the filler through the polymer matrix as well as to control the thermal history of the additives. In this mode, the highly branched polymer is fed using the main resin feeder, and is followed by the addition of layered materials through the downstream side stuffer or vice versa. Alternatively, the layered materials and highly branched polymer can be fed using the main feeders at the same location or the layered materials and highly branched polymer may be premixed and fed through a single side stuffer. This method is particularly suitable if there is only one side stuffer port available, and if there are limitations on the screw design.

In addition to the compounders described above, the article of the present invention may be produced using any suitable mixing device such as a single screw compounder, blender, mixer, spatula, press, extruder, or molder.

The article of the invention can be of any size and form, a liquid such as a solution, dispersion, latex and the like, or a solid such as a sheet, rod, particulate, powder, fiber, wire, tube, woven, non-woven, support, layer in a multilayer structure, and the like. The article of the invention can be used for any purpose, as illustrated by packaging, woven or non-woven products, protective sheets or clothing, and medical implement.

In one preferred embodiment of the invention, the article of the invention comprises the base of an imaging member. Such imaging members include those utilizing photographic, electrophotographic, electrostatographic, photothermographic, migration, electrothermographic, dielectric recording, thermal dye transfer, inkjet and other types of imaging. In a more preferred embodiment of the invention, the article of the invention comprises the base of a photographic imaging member, particularly a photographic reflective print material, such as paper or other display product.

Typical bases for imaging members comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin-coated paper, voided polymers, microvoided polymers, microporous materials, nanovoided polymers and nanoporous materials, fabric, and the like. The material of the invention comprising a matrix polymer and the splayed layered materials can be incorporated in any of these materials and/or their combination for use in the base of the appropriate imaging member. In case of a multilayered imaging member, the aforementioned material of the invention can be incorporated in any one or more layers, and can be placed anywhere in the imaging support, e.g., on the topside, or the bottom side, or both sides, and/or in between the two sides of the support. The method of incorporation can include extrusion, co-extrusion with or without stretching, blow molding, casting, co-casting, lamination, calendering, embossing, coating, spraying, molding, and the like. The image receiving layer or layers, as per the invention, can be placed on either side or both sides of the imaging support.

In one preferred embodiment, the imaging support of the invention comprising a matrix polymer and the splayed layered materials of the invention may be formed by extrusion and/or co-extrusion, followed by orientation, as in typical polyester based photographic film base formation. Alternatively, a composition comprising a matrix polymer and the splayed layered materials of the invention can be extrusion coated onto another support, as in typical resin coating operation for photographic paper. In another embodiment, a composition comprising a matrix polymer and the splayed layered materials of the invention can be extruded or co-extruded and preferably oriented into a preformed sheet and subsequently laminated to another support, as in the formation of typical laminated reflective print media.

In a preferred embodiment, the material of this invention may be incorporated in imaging supports used for image display such as reflective print media including papers, particularly resin-coated papers, voided polymers, and combinations thereof Alternatively, the imaging support may comprise a combination of a reflective medium and a transparent medium, in order to realize special effects, such as day and night display. In a preferred embodiment, at least one layer comprising the material of the present invention is incorporated in a paper support, because of its widespread use. In another preferred embodiment, at least one layer comprising the nanocomposite of the present invention may be incorporated into an imaging support comprising a voided polymer, because of its many desirable properties such as tear resistance, smoothness, improved reflectivity, metallic sheen, and day and night display usage.

The imaging supports of the invention can comprise any number of auxiliary layers. Such auxiliary layers may include antistatic layers, back mark retention layers, tie layers or adhesion promoting layers, abrasion resistant layers, conveyance layers, barrier layers, splice providing layers, UV absorption layers, antihalation layers, optical effect providing layers, waterproofing layers, and the like.

The following examples illustrate the practice of this invention. They are not intended to be exhaustive of all possible variations of the invention. Parts and percentages are by weight unless otherwise indicated.

The hyperbranched polymers used were:

TABLE 1

| Polymer ID | Name | Supplier | Molecular Weight $M_n$ |
|---|---|---|---|
| P1 | H20 | Perstorp | 5100 |
| P2 | H30 | Perstop | 3500 |
| P3 | H40 | Perstorp | 2100 |
| P4 | Hybrane SL 1410 | DSM | 1410 |
| P5 | Hybrane P/S 80 1200 | DSM | 1200 |
| P6 | Hyperbranched Polyamide (1) | Synthesized | 1500 |
| P7 | Hyperbranched Polyether (2) | Synthesized | 1400 |
| P8 | Hyperbranched Aromatic Polyester with epoxy ends (3) | Synthesized | 7200 |
| P9 | Hyperbranched Polyvinylbenzylchloride quaternized with dimethylaminoethanol (4) | Synthesized | 2000 |

The symbol: ⁓⁓

Represents a repeating unit that is similar to the corresponding backbone.

P1–P4

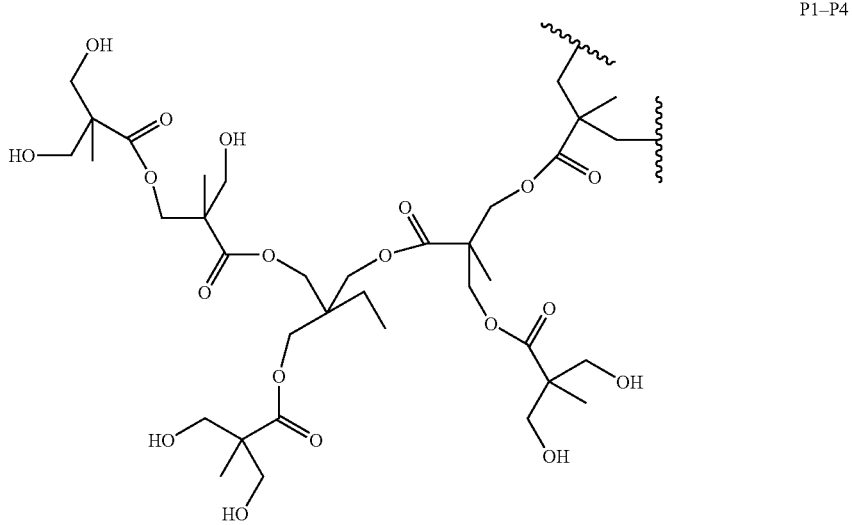

-continued
P4–P5
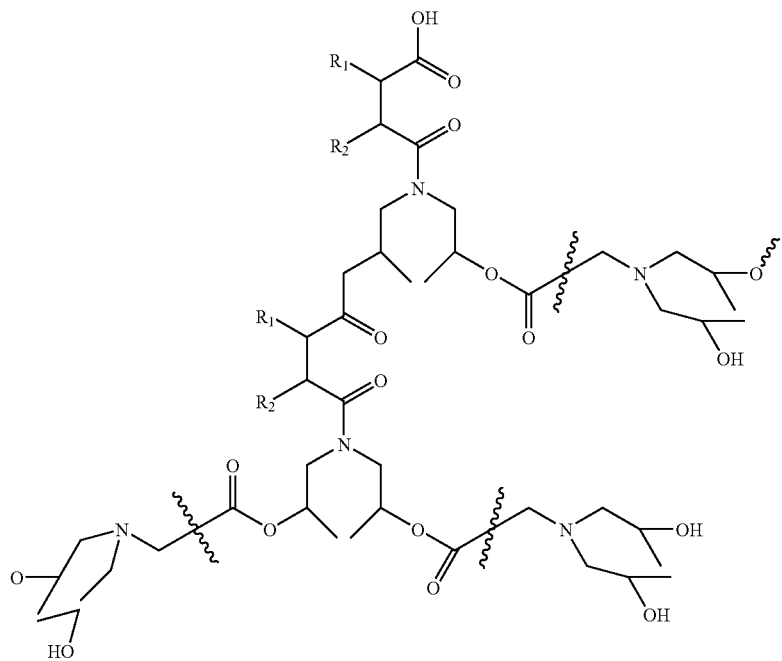
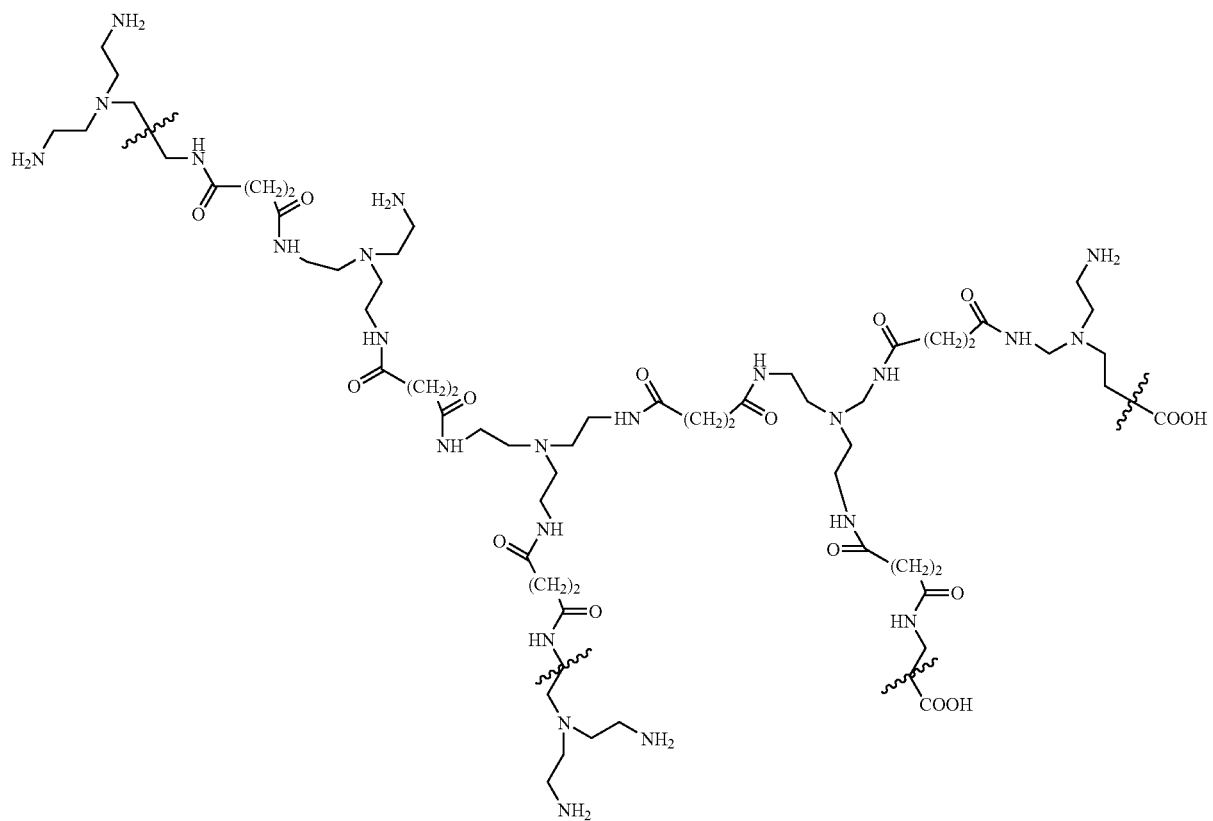
1

-continued
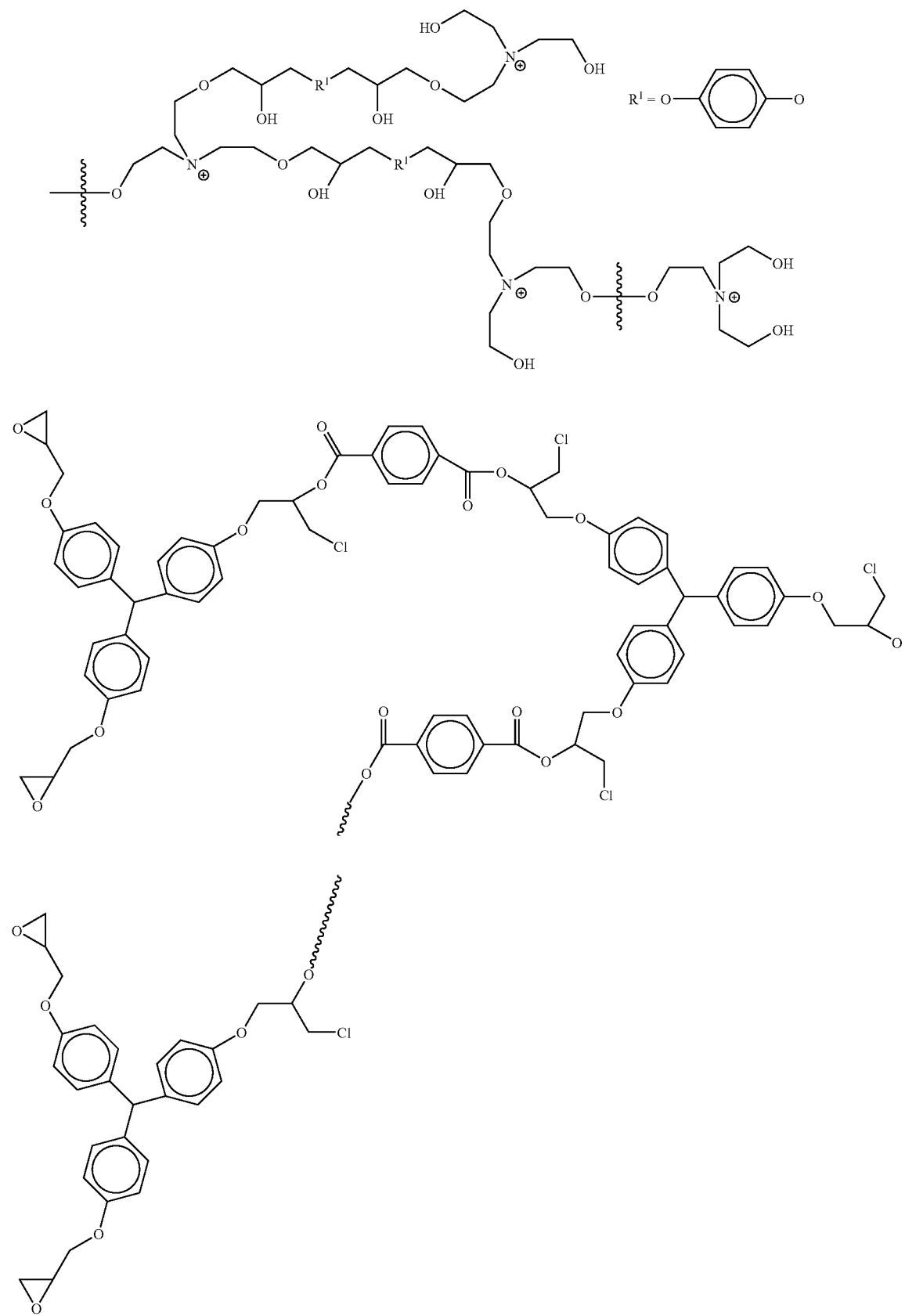

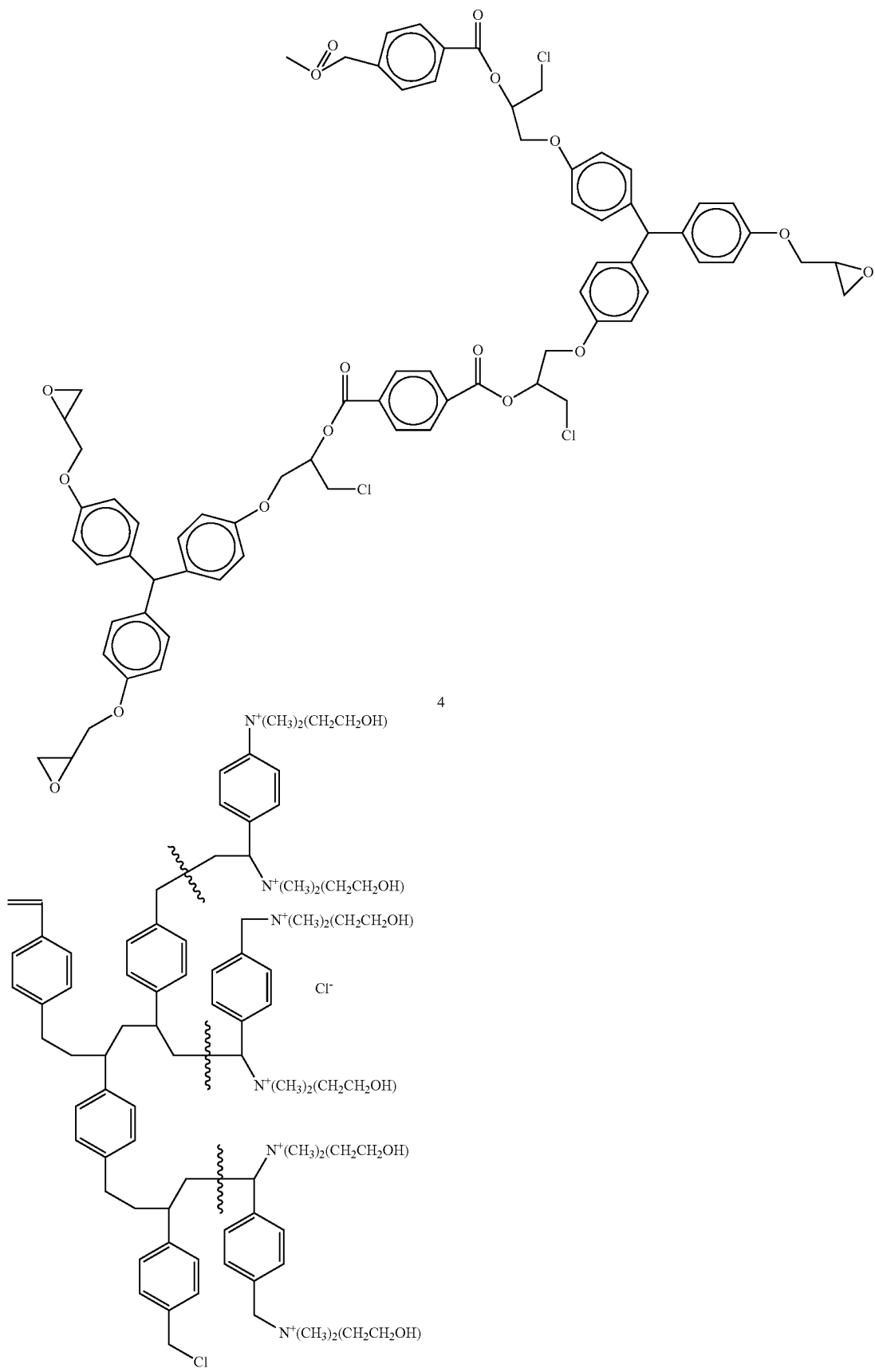

The procedures for the syntheses of hyperbranched polymers:

Synthesis of P6:

To a three-neck round flask equipped with a stirring bar and water condenser, 117 grams (0.6838 mol) of succinic acid, 100 grams (0.6838 mol) of tris(2-aminoethyl)amine, and 440 ml of deionized water were added. The solution was heated at 60° C. for three hours. The salt solution obtained was concentrated to contain approximately 65 wt % solid (35 wt % water) and then added to a 1 liter stainless steel autoclave. Polymerization was carried out at 235° C. and approximately $3.1 \times 10^3$ kP for 3 hours. The polymer was precipitated twice from cold acetone and dried at room temperature under vacuum for 24 hours.

Synthesis of P7:

35 grams of resorcinol diglycidyl ether, 35.2 grams of triethanolamine and 0.884 grams of potassium tert-butoxide were combined with a stirring bar in a 500 ml three neck round bottom flask with a water condenser with N2 inlet/outlet. The flask was submerged in a hot oil bath at 120° C. The reaction mixture was stirred and heated for 5 hrs. The polymer was precipitated from heptane and dried under vacuum overnight. 80 grams of water was combined with 20 grams of dried polymer as prepared above in a 500 ml beaker. Acetic acid was added to the mixture while stirring until the polymer was completely dissolved in water and the pH was neutral.

Synthesis of P8:

Terephthaloyl chloride (0.67 g, 3.28 mmol) and tetrabutylammonium bromide (0.319 g, 0.9895 mmol) were charged into a 25 ml air-free flask along with a stir bar in the dry box. The flask was septumed and removed from the dry box. Triphenylolmethane triglycidyl ether (4.5 g, 9.9 mmol) and 7 ml of toluene were added and the solution was stirred at 100° C. in a nitrogen atmosphere for one hour. The product was precipitated in 250 ml of methanol, collected via suction filtration, and dried in the vacuum oven.

Synthesis of P9:

To a three neck round bottom flask equipped with a magnetic stir bar and a water condenser with N2 inlet/outlet, 76 grams of 4-vinyl benzylchloride, 15 grams of CuCl, 47 grams of dipyridyl and 200 ml of chlorobenzene were added. The solution was heated at 125–130° C. for 45 min. The polymer was precipitated with cold methanol and dried at 40 in a vacuum oven.

The layered materials used were:

TABLE 2

| Layered Material ID | Name | Supplier | (001) Basal Plane Interplanar Spacing (Å) |
|---|---|---|---|
| L1 | NaCloisite ® | Southern Clay Products | 13 |
| L2 | Laponite ® RDS | Southern Clay Products | 13 |
| L3 | Cloisite ® 25A | Southern Clay Products | 21 |
| L4 | Ag-doped Vanadium Pentoxide | Eastman Kodak Company | 12 |

The methods of characterization used included:

The (001) basal plane spacing was measured by X-ray diffraction using a Rigaku Bragg-Brentano diffractometer in reflection mode geometry utilizing a monochromator tuned to CuKα radiation. All measurements were performed in ambient air.

Further assessment of the layered material morphology was performed by transmission electron microscopy (TEM) using a microscope operating at 200 kV accelerating voltage (JEM-2000FX from JEOL, Inc.). The following examples highlight the observation of splaying of layered materials using highly branched polymer.

EXAMPLE 1–12

Sodium Cloisite® Splayed by Hyperbranched Aliphatic Polyesters

An aqueous mixture of 3% solid concentration of layered materials was made in a 50° C. water bath using a high shear device. A solvent mixture of water/methanol at a weight ratio of 75:25 (solvent mixture A) and 60:40 (solvent mixture B) was also made. The layered material-water dispersion, the hyperbranched polymers P1, P2, and P3 were brought together under high sheer in two different solvent mixtures to form a total 3% solids dispersion. The mixtures were allowed to stir for an additional three hours to ensure total mixing. A few drops from the mixture were deposited onto a glass slide and allowed to dry in ambient air. The structure of the resultant solid film, which formed on the glass sample holder, was investigated by XRD. The results from XRD analysis are shown in Table 3. For TEM analysis, samples were prepared by dispersing the polymer/layered material mixture onto carbon Formvar® film deposited on 200 mesh Cu grid (from E. F. Fullam, Inc.), and then viewed under $100^{-7}$ torr vacuum at room temperature.

TABLE 3

| Example | P | P/L1 | (001) Basal Plane Spacing (Å) |
|---|---|---|---|
| 1 | P1 | 9/1 | 51 |
| 2 | P2 | 9/1 | 43 |
| 3 | P3 | 9/1 | 41 |
| 4 | P1 | 9/1 | 48 |
| 5 | P2 | 9/1 | 41 |
| 6 | P3 | 9/1 | No peak observed |
| 7 | P1 | 5/5 | 29 |
| 8 | P2 | 5/5 | 30 |
| 9 | P3 | 5/5 | 30 |
| 10 | P1 | 5/5 | 29 |
| 11 | P2 | 5/5 | 30 |
| 12 | P3 | 5/5 | 33 |

Compared to the (001) basal plane spacing reported for layered material L1, examples 1–12 show evidence of an increase in basal plane spacing, indicating splaying such as intercalation and/or exfoliation has occurred. FIG. 1 demonstrates the effect of the ratio of polymer P1 to layered material L1 on the observed (001) basal plane XRD peak position.

Interaction of polymers with layered materials can be directly examined by transmission electron microscopy to determine the extent of splaying such as intercalation and exfoliation. When completely splayed (exfoliated) with P3 polymer, as in Example 6, the layered material layers are pushed so far apart that they are seen as a collection of individual "slivers" of layered material platelets, each corresponding to an individual layer of the layered materials, and each with no apparent interaction with any neighboring layered material platelet.

Figure 2:
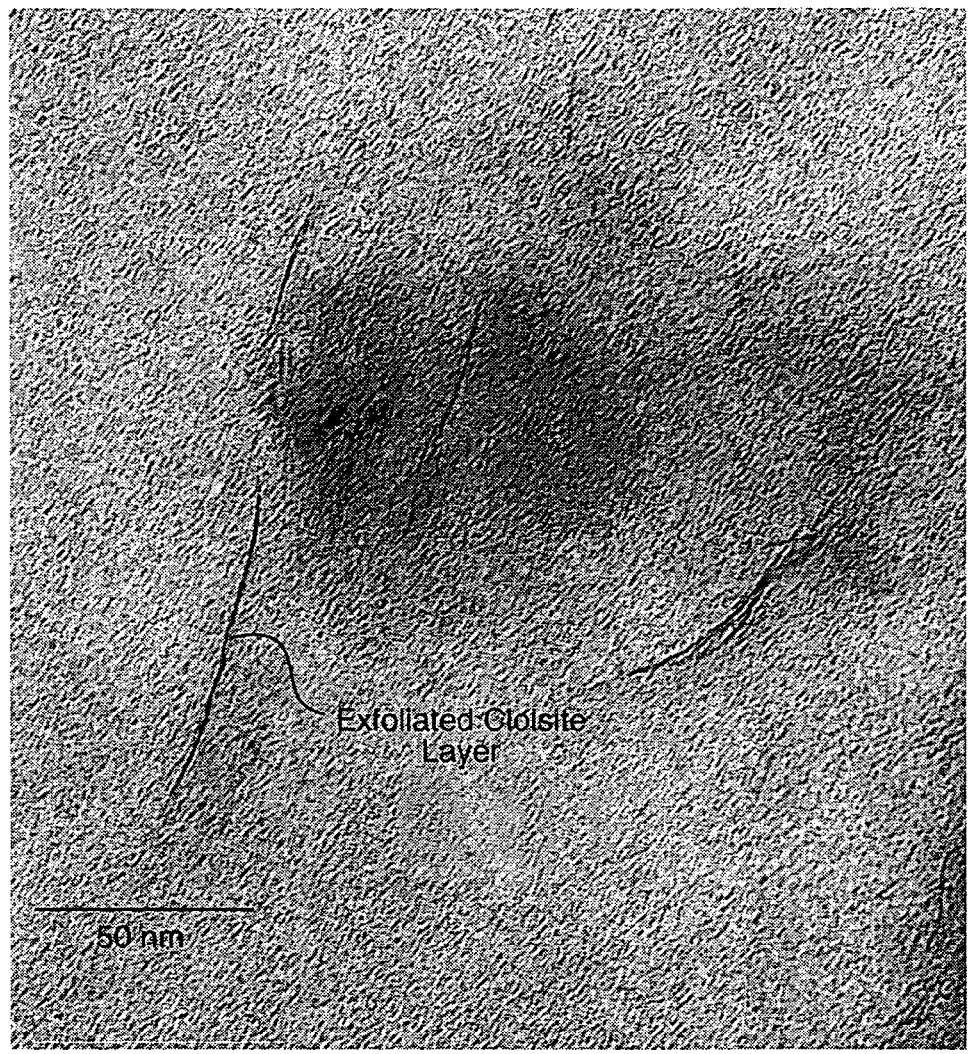
FIG. 2 illustrates a TEM image of P1 to L1 at a ratio of 90:10, as in Example 6.

FIG. 2, a TEM image of P1 to L1 at a ratio of 90:10, as in Example 6, is in good agreement with the XRD pattern for the same material as shown in FIG. 1C.

EXAMPLE 13

Sodium Cloisite® Splayed by Hyperbranched Aliphatic Polyester

Hyperbranched polymer P1 (95 parts) was weighed into a glass vial and heated until the polymer melted. L1 (5 parts) was added and the sample was stirred for several minutes. The sample was cooled to room temperature. The resultant nanocomposite (2.85 g) was dispersed in water (14 g). The mixture was heated until the water boiled, was removed from the heat, and stirred using a magnetic stir bar for 16 hours. A white dispersion resulted. An aliquot of this dispersion was deposited onto a glass slide and allowed to dry in ambient air. The structure of the resultant solid film formed on the glass sample holder was investigated by XRD. The results from XRD analysis are shown in Table 4.

TABLE 4

| Example | P | P/L1 | (001) Basal Plane Spacing (Å) |
|---|---|---|---|
| 13 | P3 | 95/5 | No peak observed |

Compared to the (001) basal plane spacing reported for layered material L1, example 13 shows evidence that layered material splaying has occurred.

EXAMPLE 14

Sodium Coisite® Splayed by Dimethylaminoethanol Quaternized Hyperbranched Poly(Vinyl Enzylchloride)

An equal amount of L1 was mixed with P9 in water at room temperature for 15 hrs. A few drops from the mixture were deposited onto a glass slide and allowed to dry in ambient air. The structure of the resultant solid film, which formed on the glass sample holder, was investigated by XRD. The results from XRD analysis are shown in Table 5.

TABLE 5

| Example | P | P/L1 | (001) Basal Plane Spacing (Å) |
|---|---|---|---|
| 14 | P9 | 90/10 | No peak observed |

Compared to the (001) basal plane spacing reported for layered material L1, example 14 shows evidence that layered material exfoliation has occurred, as confirmed by TEM.

EXAMPLE 15–22

Laponite® Splayed with Hyperbranched Polyesteramides

Laponite® was mixed with a variety of hyperbranched polyesteramides in water at room temperature for 15 hrs. A few drops from each mixture was deposited onto a separate individual glass slide and allowed to dry in ambient air. The structures of the resultant solid films, formed on the glass sample holders, were investigated by XRD. The results from XRD analysis are shown Table 6.

TABLE 6

| Example | P | P/L2 | Spacing (Å) |
|---|---|---|---|
| 15 | P4 | 25/75 | 19 |
| 16 | P4 | 50/50 | 29 |
| 17 | P4 | 75/25 | No peak observed |
| 18 | P4 | 90/10 | No peak obseved |
| 19 | P5 | 25/75 | 20 |
| 20 | P5 | 50/50 | 28 |
| 21 | P5 | 75/25 | No peak observed |
| 22 | P5 | 90/10 | No peak observed |

Compared to the (001) basal plane spacing reported for layered material L2, examples 15–22 show evidence of an increase in basal plane spacing, indicating splaying, such as intercalation and/or exfoliation, has occurred.

EXAMPLE 23–26

Laponite® Splayed with Hyperbranched Polyether

Laponite® was mixed with hyperbranched polyether in water at room temperature for 15 hrs. From the mixture, a few drops were deposited onto a glass slide and allowed to dry in ambient air. The resultant solid film was formed on a glass sample holder for structural investigation by XRD. The results from XRD analysis are shown in Table 7.

TABLE 7

| Example | P7/L2 | Spacing (Å) |
|---|---|---|
| 23 | 25/75 | 16 |
| 24 | 50/50 | 24 |
| 25 | 75/25 | No peak observed |
| 26 | 90/10 | No peak observed |

Compared to the (001) basal plane spacing reported for layered material L2, examples 23–26 show evidence of an increase in basal plane spacing, indicating splaying, such as intercalation and/or exfoliation, has occurred.

EXAMPLE 27–32

Laponite® Splayed with Hyperbranched Polymers by Thermal Mixing

Hyperbranched polymers were weighed into a glass vial, and heated until the polymer melted. L2 was added and the samples were stirred for several minutes. The samples were cooled to room temperature. The resultant nanocomposites were reheated, an aliquot of each sample was smeared onto a glass side, and then cooled to room temperature, followed by analysis using XRD. The results from XRD analysis are shown in Table 8.

TABLE 8

| Example | P | P/L2 | Spacing (Å) |
|---|---|---|---|
| 27 | P4 | 95/5 | No peak observed |
| 28 | P4 | 75/25 | 29 + No peak observed |
| 29 | P5 | 95/5 | No peak observed |
| 30 | P5 | 90/10 | No peak observed |
| 31 | P6 | 95/5 | No peak observed |
| 32 | P8 | 95/5 | No peak observed |

Compared to the (001) basal plane spacing reported for layered material L2, examples 27–32 show evidence of an increase in basal plane spacing, indicating splaying, such as intercalation and/or exfoliation, has occurred.

EXAMPLE 33

Ag-Doped Vanadium Pentoxide Splayed with Hyperbranched Polyvinylbenzylchloride Quaternized with Dimethylaminoethanol An equal amount of L4 was mixed with P9 in water at room temperature for 15 hrs. From the mixture, a few drops were deposited onto a glass slide and allowed to dry in ambient air. The structure of the resultant solid film formed on a glass sample holder was investigated by XRD. The results from XRD analysis are shown in Table 9.

TABLE 9

| Example | P | P/L4 | (001) Basal Plane Spacing (Å) |
|---|---|---|---|
| 33 | P9 | 50/50 | 39 |

Figure 3:
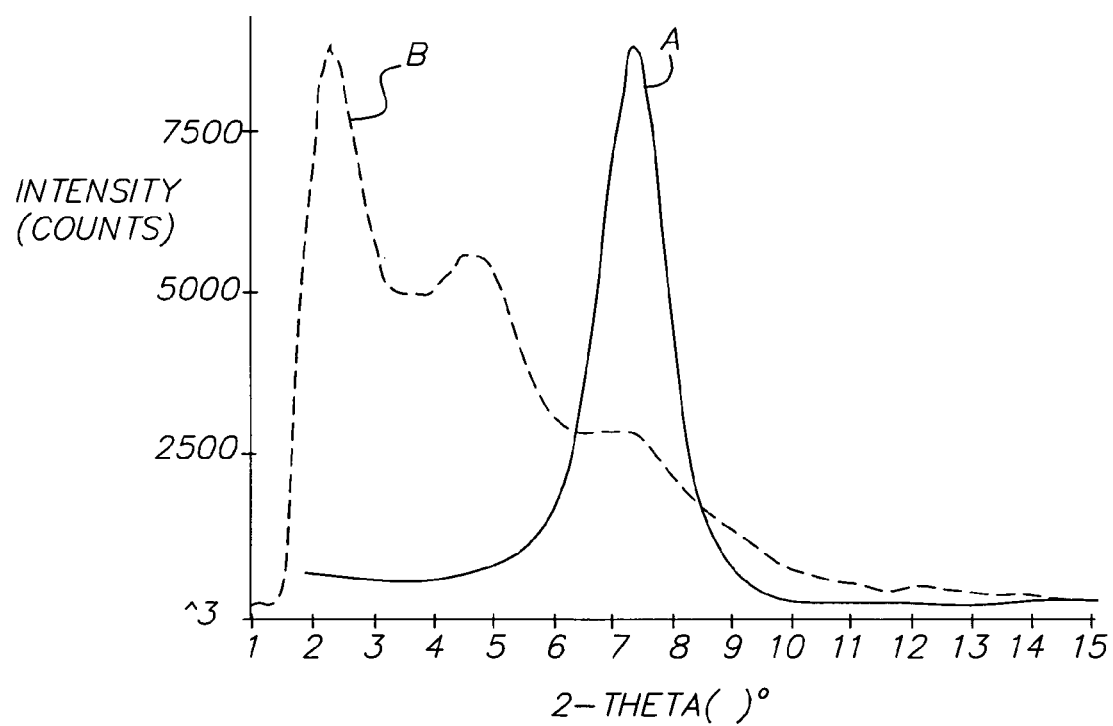
FIG. 3 illustrates XRD patterns for (A) L4 and (B) P9 to L4 at a ratio of 50:50, as in Example 33.

Compared to the (001) basal plane spacing reported for layered material L4, example 33 shows evidence of an increase in basal plane spacing, indicating intercalation has occurred. FIG. 3 demonstrates the effect of the ratio of polymer P9 to layered material L4 on the observed (001) basal plane XRD peak position.

EXAMPLE 24

Organically modified Cloisite® 25A Splayed by Hyperbranched Aliphatic Polyester Hyperbranched polymer P1 (95 parts) was weighed into a glass vial and heated until the polymer melted. L3 (5 parts) was added, and the samples were stirred for several minutes, followed by cooling to room temperature. The resultant nanocomposite was reheated, an aliquot was smeared onto a glass side, and then cooled to room temperature, followed by analysis using XRD. The results from XRD analysis are shown in Table 10.

TABLE 10

| Example | P | P/L1 | (001) Basal Plane Spacing (Å) |
|---|---|---|---|
| 34 | P3 | 95/5 | 29 |

When compared to the (001) basal plane spacing reported for layered material L3, example 34 shows evidence that intercalation of the layered material has occurred.

EXAMPLE 35

Sodium Cloisite® Splayed by Hyperbranched Aliphatic Polyester Mixed with Poly(Ethylene Terephthalate)

An aliquot of example 13 (50 parts) was thermally mixed with poly(ethylene terephthalate) (50 parts). The resultant mixture was cooled to room temperature. The resultant mixture was reheated, an aliquot was smeared onto a glass side, and then cooled to room temperature, followed by analysis using XRD. The results from XRD analysis are shown in Table 11.

TABLE 11

| Example | Composition | (001) Basal Plane Spacing (Å) |
|---|---|---|
| 35 | PET:P1:L150:47.5:2.5 | No peak observed |

Compared to the (001) basal plane spacing reported for layered material in example 13, the layered material L1 remains splayed.

The invention has been described in detail with particular reference to certain preferred embodiments thereof, but it will be understood that variations and modifications can be effected within the spirit and scope of the invention.

What is claimed is:

1. A splayed material comprising a natural, unfunctionalized, clay layered material splayed by a highly branched polymer, wherein said highly branched polymer comprises at least one hyperbranched polymer, and wherein said hyperbranched polymer is prepared by a chain polymerization of a monomer of the formula $M_n\text{-}R^1\text{-}M^2m$ wherein (i) $R^1$ is a substituted or non-substituted alkyl, alkenyl, or aryl moiety and hetero atom containing substituted or non-substituted alkyl, alkenyl, or aryl moiety; (ii), $M^1$ and $M^2$ are reactive groups that react independently of each other in which $M^1$ is a polymerization group and $M^2$ is a precursor of a moiety $M^{2*}$ which initiates the polymerization of $M^1$ as a result of being activated by any source; and (iii), n and m are integers of at least 1.

2. The material of claim 1 wherein said hyperbranched polymer comprises a segment of a copolymer.

3. The material of claim 1 wherein said hyperbranched polymer possesses water soluble or dispersible segments or groups either at the ends thereof or in the backbone.

4. The material of claim 3 wherein said water soluble or water dispersible segments or groups are cationic, anionic, or non-charged.

5. The material of claim 4 wherein said anionic segments or groups are carboxylic acids and their salts, sulfonic acid and their salts, or phosphonic acid and their salts.

6. The material of claim 4 wherein said cationic segments or groups are N, P, and S containing onium salts.

7. The material of claim 4 wherein said non-charged segments or groups are —OH, polyether, substituted or non-substitute amines.

8. The material of claim 1 wherein:

$M^1$ is a non-substituted or substituted vinylic group or epoxy; and $M^2$ is X, —$CH_2$X, —CH($CH_3$)X, —C(O)$CH_2$X, —C(O)CHX$_2$, —C(O)CX$_3$, —OC(O)$CH_2$X, —OC(O)CHX$_2$, or —OC(O)CX$_3$ wherein:

X is Cl, Br, I, S—C(=S)—NR$^4$R, S—C(=S)—OR$^4$, —O—NR$^4$R, OH or;

wherein R$^4$ is —(CH$_2$)r, —C$_6$H5, —C(O)O or —C(O);

R is —(CH$_2$)r, —C$_6$H$_5$, —C(O)O or —C(O) unless R is terminal, wherein said terminal R also includes a hydrogen, aryl or alkyl group;

R$^7$, R$^8$ and R$^9$ are each independently a linear or branched alkyl or an aromatic group; and r=1–12.

9. The material of claim 1 wherein said $M^1{}_n$-$R^1$-$M^2{}_m$ comprises:

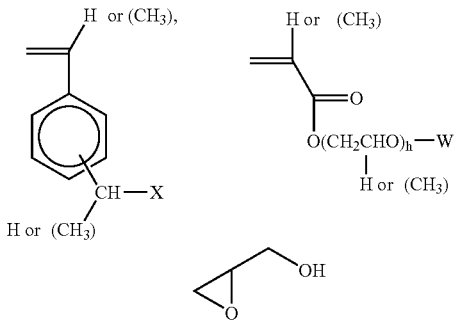

wherein h is an integer of at least 1;
W is —C(O)CH$_2$X, —C(O)CHX$_2$ or —C(O)CX$_3$; and X is Cl, Br, I,

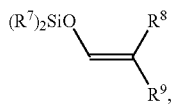

S—C(=S)—Z (Z=R$^4$, OR$^4$, NR$^4$R), or O—NR$^4$R$^5$;
wherein R$^4$ is —(CH$_2$)$_r$, —C$_6$H$_5$, —C(O)O or —C(O);
R$^5$ is —(CH$_2$)$_r$, —C$_6$H$_5$, —C(O)O or —C(O) unless R$^5$ is terminal, wherein said terminal R$^5$ also includes a hydrogen, aryl or alkyl group;
R$^7$, R$^8$ and R$^9$ are each independently a linear or branched alkyl or aromatic group.

10. The material of claim 1 wherein said clay comprises smectite clay.

11. The material of claim 1 wherein said highly branched polymer has a molecular weight of between about 300 and 10,000,000 g/mole.

12. The material of claim 1 wherein said highly branched polymer has a molecular weight of between about 1,000 and 1,000,000 g/mole.

13. The material of claim 1 wherein the weight ratio of said layered material to said highly branched polymer is between 0.1:99.9 and 99.9:0.1.

14. The material of claim 1 wherein said splayed material is exfoliated.

15. The material of claim 1 wherein said splayed material is intercalated.

16. An article comprising a matrix and a natural, unfunctionalized, clay layered material splayed by a highly branched polymer, wherein said highly branched polymer comprises a hyperbranched polymer, and wherein said hyperbranched polymer is prepared by a chain polymerization of a monomer of the formula $M^1{}_n$-$R^1$-$M^2{}_m$ wherein (i) R$^1$ is a substituted or non-substituted alkyl, alkenyl, or aryl moiety and hetero atom containing substituted or non-substituted alkyl, alkenyl, or aryl moiety; (ii), M$^1$ and M$^2$ are reactive groups that react independently of each other in which M$^1$ is a polymerization group and M$^2$ is a precursor of a moiety M$^{2*}$ which initiates the polymerization of M$^1$ as a result of being activated by any source; and (iii), n and m are integers of at least 1.

17. The article of claim 16 wherein said matrix comprises at least one polymer.

18. The article of claim 17 wherein said at least one polymer is water soluble.

19. The article of claim 18 wherein said water soluble polymer is at least one member selected from the group consisting of gelatin, poly(vinyl alcohol), poly(ethylene oxide), polyvinylpyrrolidone, poly(acrylic acid), poly(styrene sulfonic acid), poly(acrylamide), and quatemized polymer.

20. The article of claim 17 wherein said polymer comprises a synthetic polymer.

21. The article of claim 20 wherein said matrix polymer comprises polyester.

22. The article of claim 16 wherein said highly branched polymer comprises at least one multifunctional group, wherein said multifunctional groups comprises at least one component capable of splaying said layered material and at least one other component compatible with said matrix, and wherein said multifunctional group compatibilizes said splayed layered material with said matrix.

23. The article of claim 16 wherein:
M$^1$ is a non-substituted or substituted vinylic group or epoxy; and
M$^2$ is X, —CH$_2$X, —CH(CH$_3$)X, —C(O)CH$_2$X, —C(O)CHX$_2$, —C(O)CX$_3$, —OC(O)CH$_2$X, —OC(O)CHX$_2$, or —OC(O)CX$_3$ wherein:
X is Cl, Br, I, S—C(=S)—NR$^4$R$^5$, S—C(=S)—OR$^4$, —O—NR$^4$R$^5$, OH or

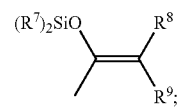

wherein R$^4$ is —(CH$_2$)$_r$, —C$_6$H$_5$, —C(O)O or —C(O);
R$^5$ is —(CH$_2$)r, —C$_6$H$_5$, —C(O)O or —C(O) unless R$^5$ is terminal, wherein said terminal R$^5$ also includes a hydrogen, aryl, or alkyl group;
R$^7$, R$^8$ and R$^9$ are each independently a linear or branched alkyl or an aromatic group; and
r=1–12.

24. The article of claim 16 wherein said $M^1{}_n$-$R^1$-$M^2{}_m$ comprises:

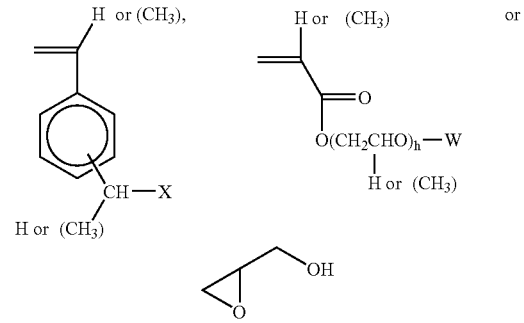

wherein h is an integer of at least 1;
W is —C(O)CH$_2$X, —C(O)CHX$_2$ or —C(O)CX$_3$; and X is Cl, Br, I,

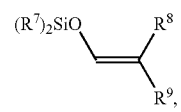

S—C(=S)—Z (Z=R$^4$, OR$^4$, NR$^4$R), or O—NR$^4$R$^5$;

wherein $R^4$ is $—(CH_2)_r$, $—C_6H_5$, $—(O)O$ or $—C(O)$;

$R^5$ is $—(CH_2)_r$, $—C_6H_5$, $—C(O)O$ or $—C(O)$ unless $R^5$ is terminal, wherein said terminal $R^5$ also includes a hydrogen, aryl, or alkyl group;

$R^7$, $R^8$ and $R^9$ are each independently a linear or branched alkyl or aromatic group.

25. The article of claim 16 wherein said hyperbranched polymer possesses water soluble or dispersible segments or groups either at the ends thereof or in the backbone.

26. The article of claim 25 wherein said water soluble or water dispersible segments or groups are cationic, anionic, or non-charged.

27. The article of claim 26 wherein said anionic segments or groups are carboxylic acids and their salts, sulfonic acid and their salts, or phosphonic acid and their salts.

28. The article of claim 26 wherein said cationic segments or groups are N, P, and S containing onium salts.

29. The article of claim 26 wherein said non-charged segments or groups are —OH, polyether, substituted or non-substitute amines.

30. The article of claim 16 wherein said hyperbranched polymer comprises at least one segment of a copolymer.

31. The article of claim 16 wherein said clay comprises smectite clay.

32. The article of claim 16 wherein the ratio of said splayed material to said matrix is between 0.1 to 99.9 and 99.9 to 0.1.

33. The article of claim 16 wherein said splayed material is exfoliated.

34. The article of claim 16 wherein said splayed material is intercalated.

* * * * *

UNITED STATES PATENT AND TRADEMARK OFFICE
CERTIFICATE OF CORRECTION

PATENT NO. : 7,166,657 B2
APPLICATION NO. : 10/099092
DATED : January 23, 2007
INVENTOR(S) : YuanQiao Rao et al.

It is certified that error appears in the above-identified patent and that said Letters Patent is hereby corrected as shown below:

| | |
|---|---|
| Column 32, Line 25 | In Claim 1, delete "$M_n$-$R^1$-$M^2$m" and insert -- $M_n$-$R^1$-$M^2_m$ --, therefor. |
| Column 32, Line 61 | In Claim 8, delete "—(CH$_2$)r," and insert -- —(CH$_2$)$_r$, --, therefor. |
| Column 32, Line 61 | In Claim 8, delete "—C$_6$H5," and insert -- —C$_6$H$_5$, --, therefor. |
| Column 32, Line 62 | In Claim 8, delete "—(CH$_2$)r," and insert -- —(CH$_2$)$_r$, --, therefor. |
| Column 34, Line 5 | In Claim 19, delete "quatemized" and insert -- quaternized --, therefor. |
| Column 34, Line 33 | In Claim 23, delete "—(CH$_2$)r," and insert -- —(CH$_2$)$_r$, --, therefor. |
| Column 35, Line 1 | In Claim 24, delete "—(O)O" and insert -- —C(O)O --, therefor. |
| Column 35, Line 2 | In Claim 24, delete "—$_{C_6H_5}$," and insert -- —C$_6$H$_5$, --, therefor. |

Signed and Sealed this

Twentieth Day of May, 2008

JON W. DUDAS
*Director of the United States Patent and Trademark Office*